United States Patent [19]

Hilton

[11] Patent Number: 5,222,400
[45] Date of Patent: Jun. 29, 1993

[54] FORCE AND TORQUE CONVERTER

[75] Inventor: John A. Hilton, Toongabbie, Australia

[73] Assignee: Spaceball Technologies Incorporated, Lowell, Mass.

[21] Appl. No.: 427,931

[22] Filed: Oct. 25, 1989

Related U.S. Application Data

[63] Continuation of Ser. No. 311,113, Feb. 15, 1989, abandoned, which is a continuation of Ser. No. 927,915, Nov. 6, 1986, Pat. No. 4,811,608.

[30] Foreign Application Priority Data

Dec. 18, 1985 [AU] Australia .................. PH03934

[51] Int. Cl.⁵ .............................................. G01L 3/00
[52] U.S. Cl. ........................ 73/862.043; 73/862.05; 74/471 XY
[58] Field of Search ......... 73/862.04, 862.05, 862.041, 73/862.042, 862.043; 74/471 XY; 250/221

[56] References Cited

U.S. PATENT DOCUMENTS

| | | | |
|---|---|---|---|
| 3,561,263 | 2/1971 | Ward et al. | 73/862.043 |
| 3,628,394 | 12/1971 | Keatinge et al. | 74/471 XY |
| 3,640,130 | 2/1972 | Spescha et al. | 73/862.043 |
| 3,693,425 | 9/1972 | Starita et al. | 73/862.044 |
| 3,921,445 | 11/1975 | Hill et al. | 73/862.043 |
| 4,178,799 | 12/1979 | Schmieder et al. | 73/862.045 |
| 4,488,441 | 12/1984 | Ramming | 73/862.043 |
| 4,573,362 | 3/1986 | Amlani | 73/862.045 |
| 4,589,810 | 5/1986 | Heindl et al. | 414/5 |
| 4,607,159 | 8/1986 | Goodson et al. | 74/471 XY |
| 4,680,465 | 7/1987 | Stevens | 250/221 X |
| 4,782,327 | 11/1988 | Kley et al. | 250/221 X |

FOREIGN PATENT DOCUMENTS

| | | |
|---|---|---|
| 0176173 | 4/1986 | European Pat. Off. . |
| 957980 | 2/1957 | Fed. Rep. of Germany . |
| 218458 | 2/1985 | German Democratic Rep. . |
| 224930 | 7/1985 | German Democratic Rep. . |
| 95331 | 5/1985 | Japan . |
| 2096777 | 10/1982 | United Kingdom . |

OTHER PUBLICATIONS

Grigg et al., "Wheel Force Transducers" Conf. on STRESS and STRAIN in Ener. Aug. 1973, pp. 170-175.

Primary Examiner—Michael T. Razavi
Assistant Examiner—Elizabeth L. Shopbell
Attorney, Agent, or Firm—Wolf, Greenfield & Sacks

[57] ABSTRACT

A force and torque converter provides command signals representative of a translational applied force and an applied torque extending about an axis substantially perpendicular to the axis along which the translational force is applied. The apparatus comprises a body to which the force and torque are applied, first and second connecting means attached to the body, means for biasing the connecting means to a central position and sensor means comprising two sensor devices arranged to detect a displacement force in each of the first and second connecting means respectively and which respond to the applied translation force and also respond to the torque to resolve the torque into a force comprising two components. A very important embodiment of the invention is arranged to operate in three dimensions and to resolve any applied torque into a respective components related to three mutually perpendicular axes. The apparatus can thus interpret operator applied hand signals for controlling an apparatus such as a computer based system.

3 Claims, 8 Drawing Sheets

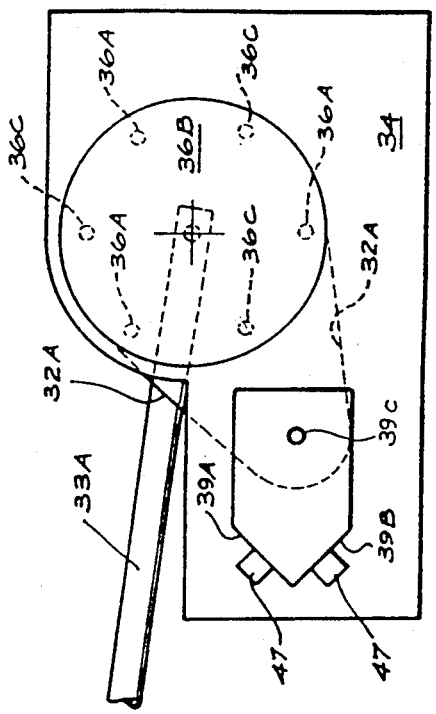
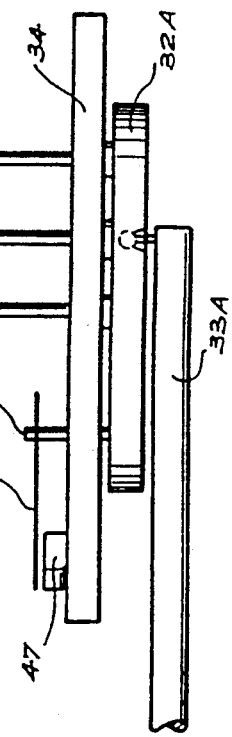
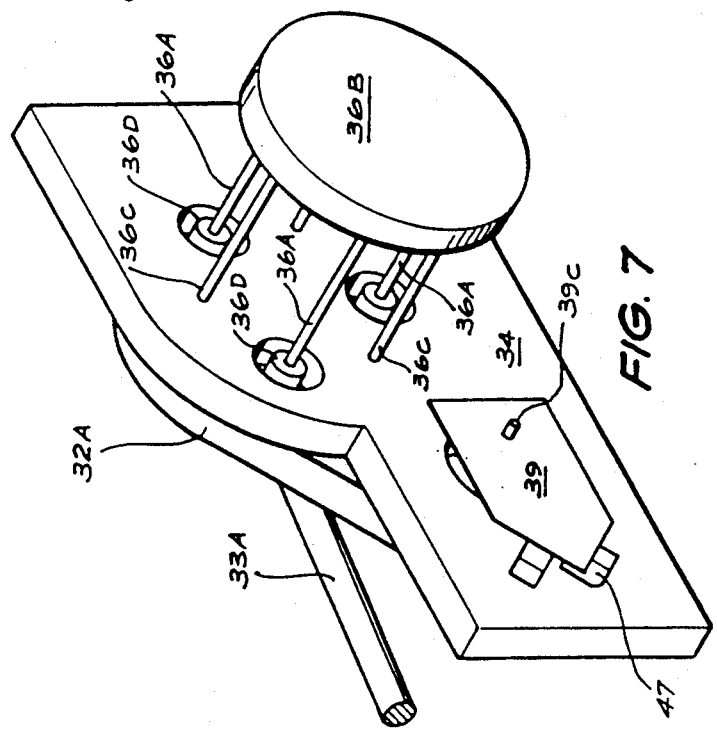
FIG. 8
FIG. 9
FIG. 7

FORCE AND TORQUE CONVERTER

This application is a continuation, of application Ser. No. 07/311,113, filed Feb. 15, 1989, which is a continuation of U.S. patent application Ser. No. 927,915 filed Nov. 6, 1986 which issued as U.S. Pat. No. 4,811,608 on Mar. 14, 1989.

FIELD OF THE INVENTION

The present invention relates to a force and torque converter and has useful applications in a wide field of activities particularly where a manual motion is to be converted into a control "signal". For example, machines such as industrial robots, back hoes and computer graphic workstations have complex control requirements.

BACKGROUND TO THE INVENTION

In existing systems, control of a vehicle such as a back hoe is achieved by manipulation of levers and more recently by joy sticks. In computer applications joy sticks are a common control system but a computer may also employ a "track ball" or a "mouse". These devices have limited directions of motion and accordingly limited commands only are possible.

In addition to a control system, there is also a need for a sensing system to monitor applied forces and torques: an example of such a sensor system is a system for monitoring applied forces and torques with respect to three axes in a manipulator (see U.S. Pat. No. 3 921 445 Hill and Sword). In that specification the manipulator is of a hand like form comprising a pair of jaws which are relatively pivotally movable under operation of an electric motor. The manipulator is defined as having a wrist and sensing means are provided for sensing the magnitude and direction of forces along three mutually orthogonal axes intersecting at the wrist and for sensing the magnitude and direction of torques about the axes. The form of the sensing means is a series of sensors extending around the longitudinal axis of the manipulator.

SUMMARY OF THE INVENTION

The present invention consists in an apparatus for providing command signals with respect to X, Y and Z mutually orthogonal axes, and the signals being representative of translational applied forces along the X and Z axes and applied torques about the X and Y axes, the apparatus comprising a body to which the forces and torques are applied, resilient connecting means attached to the body and mounting the body for receiving force and torque for urging the body to be displaced relative to a fixed base, and sensor means arranged to detect a response in the connecting means to any directional component of applied translational force in the X-Z plane, and to any directional component of applied torque about the X and the Y axis.

In the preferred embodiments described below, a very small displacement results from each of the translational force and applied torque, the connecting means being biased to a central position. However, it is possible to embody the invention in a form in which no displacement takes place and instead sensors respond whereby a signal is derived representative of the force or torque tending to cause displacement at each sensor. For example, a system in which automatic control causes the input of some energy to resist the displacement could be used, the input of energy having a corresponding signal generated for indicating the magnitude of the applied force.

The invention is especially valuable in permitting embodiments in which the applied translational force and/or the applied torque are respectively resolved into components with respect to most preferably three mutually perpendicular axes. Hereinafter the invention will be exemplified with reference to the most complex example in which a three dimensional device is utilized and it will be appreciated that a complex ergonomically designed control system can utilise an apparatus of this form. It is envisaged that for many applications a handle or grip for an operator will be provided and this grip is adapted to receive a translational force and a torque, the translational force being applied in any direction and the torque being about any desired axis. The output signals can be used to control any required device and sophisticated control of, for example, a machine can be achieved with just one control member. This can be very important for the control of complex machines which require an operator to use a multiplicity of separate levers for controlling, e.g. hydraulic circuits. Another area in which there may be very beneficial applications is for control of devices for handicapped persons.

In a preferred embodiment the apparatus is such that only at most very small displacement results from the applied translational force and/or torque. In the mechanical examples described hereinafter the mathematical error resulting from displacement is at most exceedingly small and may be disregarded for very small angles of displacement.

In one specific embodiment, the fixed base has a portion at which the X, Y and Z axes intersect and the connecting means comprise respective pairs of resiliently deformable connecting arms extending in the Z and Y directions, the arms of each pair extending away from the base portion in opposite directions to be connected to the body, and wherein the sensor means are adapted to detect a displacement in the respective connecting arms and provide signals permitting computation of the applied torque and/or force, the sensor means detecting torque about the Y axis or displacement in the X direction at respective locations in the arms extending in the Z direction on opposite sides of the X axis, and detecting torque about the X axis or displacement in the Z direction at respective locations in the connecting arms extending in the Y direction on opposite sides of the Z axis.

Preferably, the apparatus described in the previous paragraph is such that the remote ends of said arms are constrained against movement in second and third mutually perpendicular axes, which are each perpendicular to said first axis.

When the embodiment of the preceding paragraph is applied to a three dimensional version, then the connecting means comprises three pairs of arms extending mutually perpendicularly and co-operating with the body so that the respective pairs of arms are constrained about respective mutually perpendicular axes.

Apparatus according to the invention preferably includes signal processing means for processing the signals detected at the respective sensor means whereby output signals correspond with the applied torque and the applied translational force and, in the case of a three dimensional version of the invention, the output signals represent the resolution of the applied force and applied torque with respect to three mutually perpendicular axis.

A second important embodiment of the invention is one in which the connecting means comprises a series of three connecting structures each comprising an arm extending from the body and pivotally connected through a joint having universal action through at least a limited range of angles to a leg, the leg extending normally in a direction substantially at right angles to the arm to be attached to the fixed base, the biasing means biasing the leg to a central position and the leg having an ability to move against the biasing in a plane being substantially that containing the pivot point of the universal joint and substantially perpendicular to the axis of the leg.

Preferably, a universal joint providing a limited range of motion is used for the pivotal connection between the leg and the arm.

Preferably, the apparatus is arranged such that each of arms of the connecting structures has its pivotal connection with its leg member such that a reference axis of the connecting member extends from a central point in the body through the pivotal connection and this reference axis is substantially at right angles to the axis along which displacement is sensed by displacement of the pivotal connection.

Preferably, each leg member is arranged to extend at right angles to the reference axis of the associated connecting member, the remote end of the leg member being fixed.

Preferably, the biasing means includes resilient deformability provided in the leg member and for this purpose preferably a reduced diameter portion is provided in the leg member near its remote fixed end.

An important embodiment of the invention consists in an apparatus for transforming applied forces into translational components along three mutually perpendicular axes and torque components about these three axes, the apparatus comprising a body to which the force is applied, three connecting members attached to the body and extending away therefrom such that in a central position of the body remote connection points on the respective connection members lie along respective reference axes extending from a central point of the body, these reference axes being mutually perpendicular, respective leg means being pivotally connected to the respective connection members at said connection points through universal joints of limited range and motion, biasing means being provided to bias the connecting members towards the central position and sensor means for sensing displacement of each connecting member and/or each connecting leg whereby the nature of the applied force may be determined.

For this important embodiment an effective mechanical design is one in which the body is a ball-like member and each of the connecting members is generally L-shaped and extends in a plane at right angles to the corresponding leg member, the arm of the L connected to the ball-like member extending through the ball member and being pivotable about its own axis which extends at right angles to the leg member and at right angles to the reference axis of the connecting member, and the other leg of the L having a universal joint located upon the reference axis.

To facilitate a stable and durable mounting, the arm of the leg of each connecting member passing through the ball-like body can be of a cranked design to permit overlapping of the three respective arms.

Preferably, the sensor means associated with each connecting member is arranged to operate substantially in a plane and is arranged to monitor motion transverse to the reference axis of the connecting member and motion along the reference axis.

Where the device has three reference axes, rotation of the body about a first axis will cause displacement at the sensors mounted by a connecting members having reference axes perpendicular to the axis about which rotation takes place. This is due to an applied couple; there are equal and opposite reactions.

Since the invention will normally be applied in a situation in which only small motions are monitored, reference to planes and motion in planes (although representing an ideal situation) will not necessarily precisely describe the motion which in fact occurs. The motion which occurs in one embodiment is planar, but in other embodiments is over a small portion of a near-spherical surface, but for the small motions envisaged, these motions can be treated in practice as essentially planar motions and will be described in this specification as being planar.

Preferably, each sensor has a planar plate and motion is detected by a light emitting means and light detecting means.

Advantageously a data processing means collates the detected movements of the three sensor plates and produces a signal representative of the effort applied to the body of the apparatus, which may comprise translational motion, rotational motion or combinations thereof.

BRIEF DESCRIPTION OF THE DRAWINGS

Embodiments of the invention will now be described by way of example only with reference to the accompanying drawings in which:

FIG. 7 is an enlarged view of a preferred form of mounting for the respective legs of the embodiment of FIGS. 5 and 6;

FIG. 8 is an elevation of the embodiment of FIG. 7;

FIG. 9 is an inverted plan view of the embodiment of FIG. 7;

Figure 1:
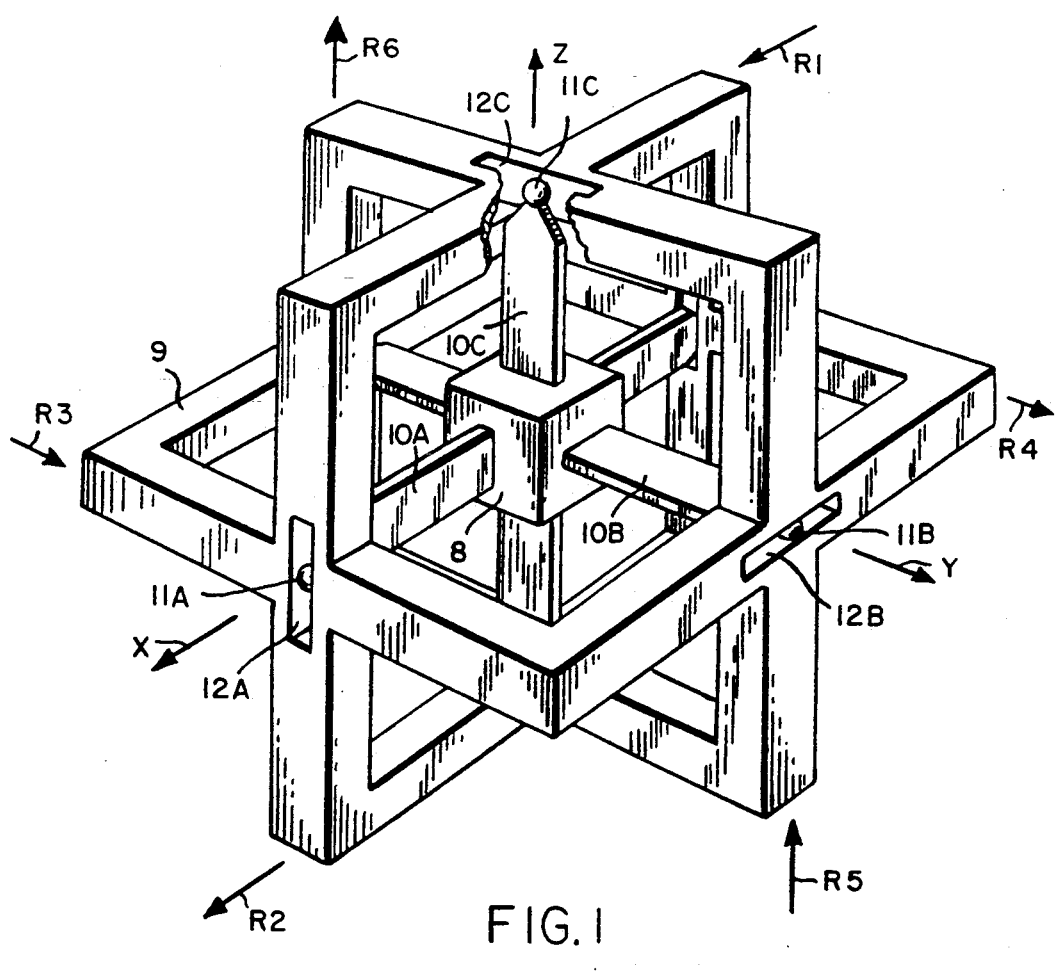
FIG. 1 is a schematic view of a first embodiment of the invention.

The theory behind the operation of the first embodiment can be more easily understood by referring to the schematic diagram of FIG. 1 which illustrates an embodiment with the mounting arrangement internally disposed relative to an operator's hand grip. Three pairs of leaf-spring elements 10A, 10B and 10C are attached to a metal base 8 and extend in three mutually perpendicular planes; the center lines of the leaf-spring elements intersect at the centre of the base 8, and extend respectively along X, Y and Z axes.

The leaf-spring elements 10A, 10B and 10C are substantially of the same length and each leaf-spring element has at the end distant from the base 8, a ball-like tip 11A, 11B and 11C which lies within a respective slot 12A, 12B and 12C in a hand grip 9 represented by a frame. Each slot provides constraint of the corresponding tip against movement relative to the grip in a direction perpendicular to the plane of the corresponding leaf spring. Thus, for example a displacement force applied to the grip 9 along the Z axis causes bending of the leaf-spring 10B only and strain gauges (not shown) measure the bending so that a signal corresponding to the displacement force can be produced. Each tip has a freedom of motion relative to the grip 9 in the plane of the corresponding leaf-spring. Thus, displacement of the hand grip along the direction of elongation of a leaf-spring, or across the direction of the leaf-spring does not result in any bending of the leaf-spring.

A displacement force at an angle to each of the axes is resolved into corresponding bending components in all leaf-spring elements.

Similarly, a torque applied to the hand grip is resolved into corresponding couples about the respective X, Y and Z axes. For example, torque about the Z axis causes equal and opposite bending of the leaf-springs 10A as the respective tips are deflected.

Forces applied along each of the axes and torques applied about each of the axes can be equated as follows:

| | |
|---|---|
| $F_X = R1 + R2$ | $T_X = R5-R6$ |
| $F_Y = R3 + R4$ | $T_Y = R1-R2$ |
| $F_Z = R5 + R6$ | $T_Z = R3-R4$ | where $F_I$ represents a force in the I direction, $T_I$ represents a torque about the I axis and R1 to R6 represent relative displacements in the directions indicated.

When a force is applied to the hand grip 9 in the X direction, there is a corresponding slight bending of one pair of leaf-spring elements 10C such that one element of the pair bends a distance equal to R1 and the other element bends a distance equal to R2. The resultant force in the X direction is thus given by $F_X=R1+R2$.

Similarly, if a torque is applied about the Y axis, one of the leaf-springs of a leaf spring pair 10C bends and produces a displacement of R1, while the other leaf-spring of the same pair bends and produces a displacement of R2 in the opposite direction. The resultant displacement about the Y axis is thus given by $T_Y=R1-R2$. The remaining forces and torques are calculated in a similar manner.

Figure 2:
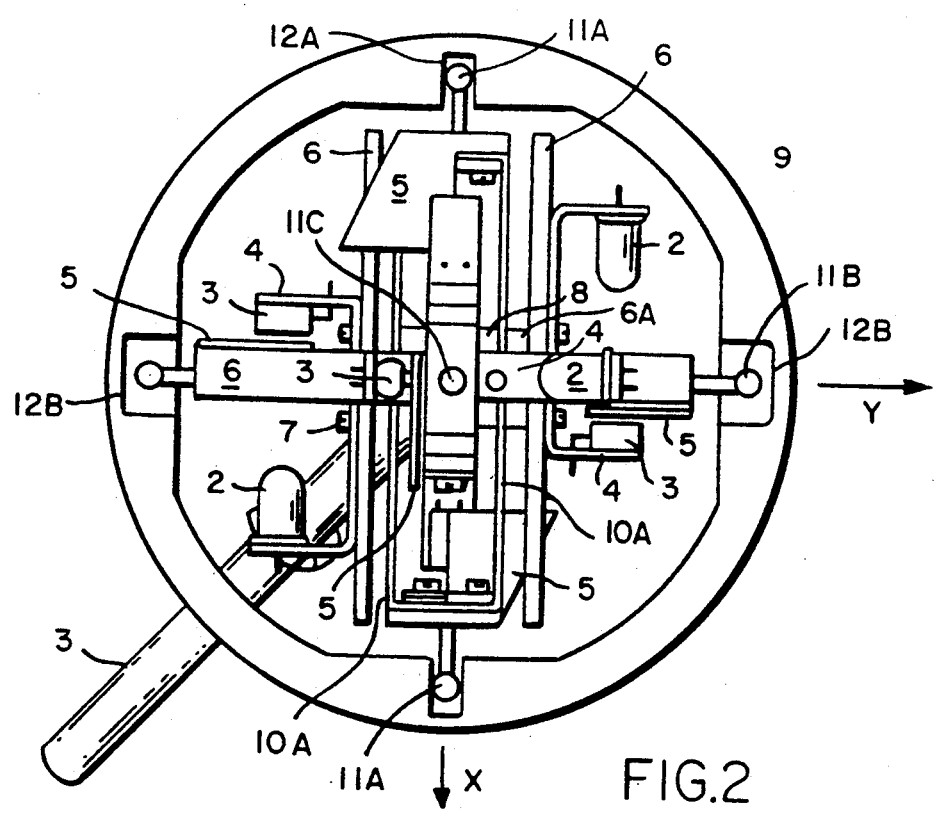
FIG. 2 is a plan view of the first embodiment in practical form with the top of the spherical hand grip removed.
Figure 3:
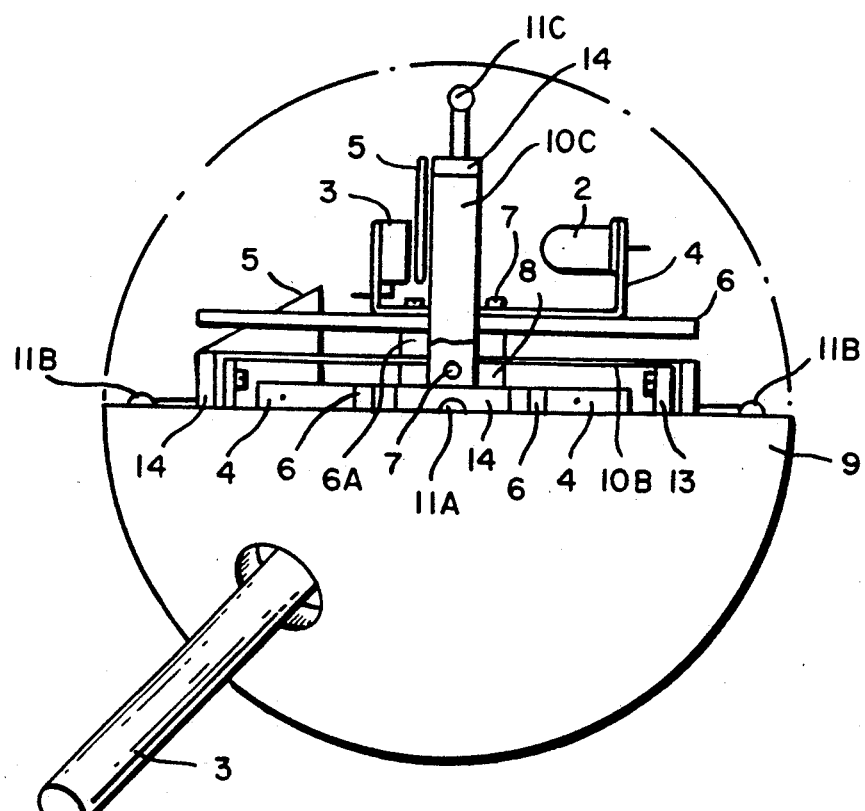
FIG. 3 is a partially broken away side-view of the first embodiment with the top of the hand grip removed and the front portion of the arm structure n the middle region just above the central plane omitted.

In practice an apparatus as shown in FIG. 2 and 3 is used to implement the principles shown by the schematic diagram of FIG. 1 in which like parts have been given like reference numerals. The sensing apparatus is supported by a fixed supporting rod 3 above a ground plane, the rod connecting to a central mounting block 8. A force or torque applied by an operator's hand placed on a spherical hand grip 9 is converted into its individual mutually perpendicular components by means of an optical detector. In this embodiment each of the X, Y and Z leaf-spring elements consists of a pair of flat resilient metal strips spaced apart and secured by screws 7 to opposite faces of the central cubic mounting block 8 and at their remote ends the strips are interconnected by a connector 13 having screws which also attaches an end fitting 14. The end fitting 14 has an axially extending shaft terminating in the ball like tip 11A, 11B or 11C.

In this embodiment, the optical detector associated with each leaf-spring comprises a light emitting diode (LED) 2 and a photodiode 3 fixedly mounted on a bracket 4. Each bracket is mounted on a respective mounting bar 6 secured by screws 7 to the central block 8, with a packing block 6A and the central part of the leaf-spring element being sandwiched between the mounting bar 6 and the central block 8. A shutter 5 is attached to the end fitting 14 (which interconnects the leaf-spring metal strips) and thus movement of the shutter alters the extent to which the radiation of the LED 2 can fall on the photodiode 3. Thus displacement is determined by alteration of current in electrical circuitry. Each photodiode is connected through wiring for electronic circuitry where the necessary computation of force and torque takes place.

Figure 4:
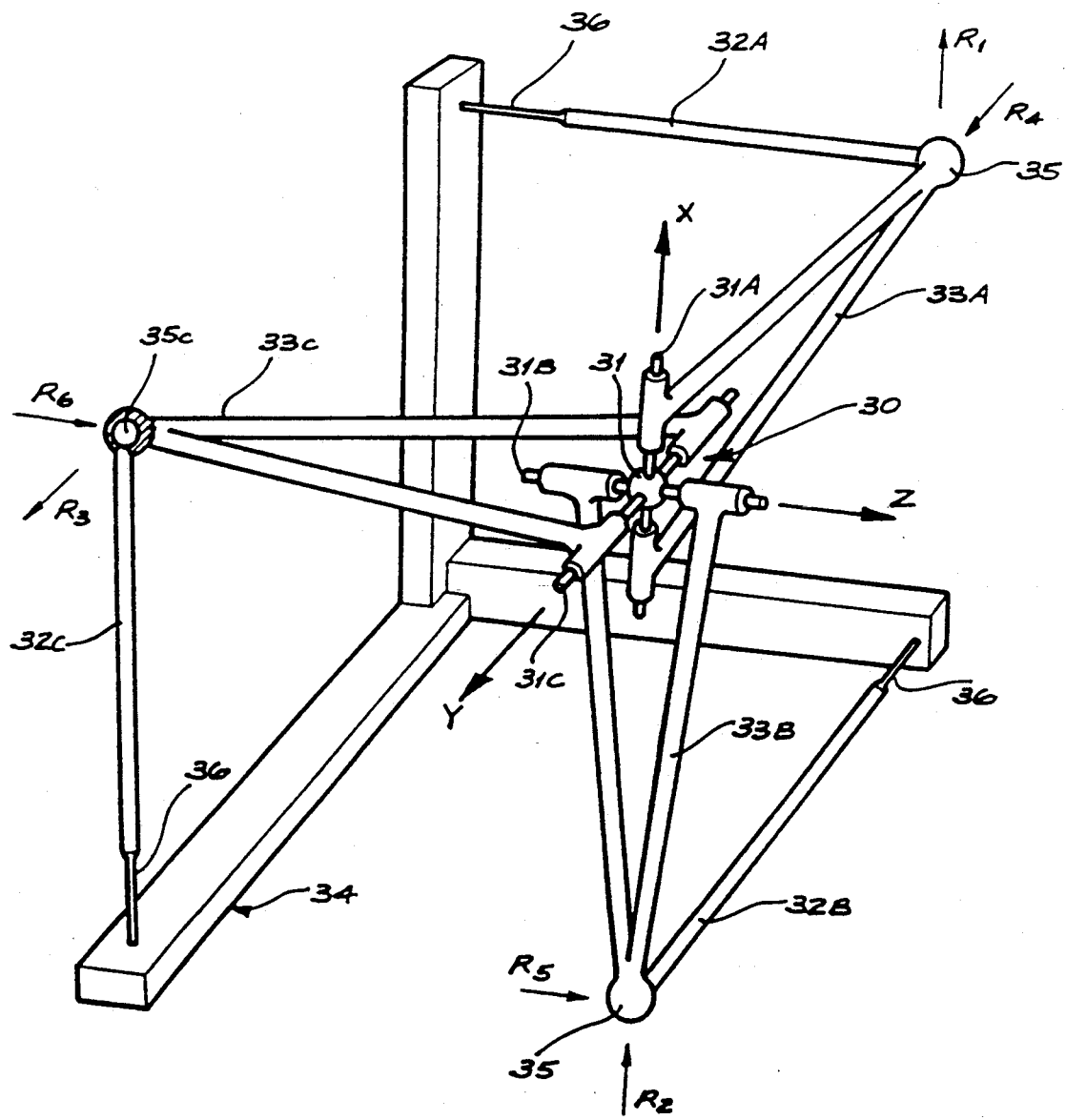
FIG. 4 is a perspective view illustrating the principles of a second embodiment in which the mounting structure is directed externally from the hand grip arrangement.

Referring to FIG. 4, a second embodiment is shown wherein a hand grip 30 is represented by a mounting ball 31 to which shafts 31A, 31B and 31C are affixed. The hand grip 30 is mounted through a set of three L-shaped mounting structures pivotally mounted on the respective mutually perpendicular shafts. The mounting structures comprise V-shaped arm members 33A, 33B and 33C and respective leg members 32A, 32B and 32C which connect the hand grip 30 to a base 34.

Each of the arm members 33A, 33B and 33C is V-shaped and hingably connected to the corresponding shafts 31A, 31B and 31C for pivotal motion respectively about the X, Z and Y axes. Each of the arm members is connected to a respective leg member 32A, 32B and 32C through a ball joint 35 which provides a limited range of universal relative motion. The base of each leg member is fixed to the base 34 and includes a narrow portion 36 near the base to provide a region of preferential bending. Each leg is of a spring metal material and has inherent resilience biasing the leg to the position shown in the drawing.

In use a force and or torque applied to the grip 30 results, in the general case, in a displacement of each of the respective arm-leg member connections and in particular displacement at the respective ball joints is detected. In a practical embodiment a detection plate assembly would be mounted near each ball joint to enable accurate measurements of deflection in a substantially planar surface perpendicular to the axis of the respective leg 32A, 32B or 32C. It can be shown that the force and torque components applied to the grip can be calculated from the respective displacements by the following equations:

| | |
|---|---|
| $F_X = R1 + R2$ | $T_X = -R3$ |
| $F_Y = R3 + R4$ | $T_Y = -R5$ |

$$F_Z = R5 + R6 \qquad T_Z = -R1$$

where $F_I$ is a force applied in the I direction. $T_1$ is a torque applied about the I axis and R1 to R6 represent the relative displacements of each respective ball joint as shown in the drawing.

Figure 5:
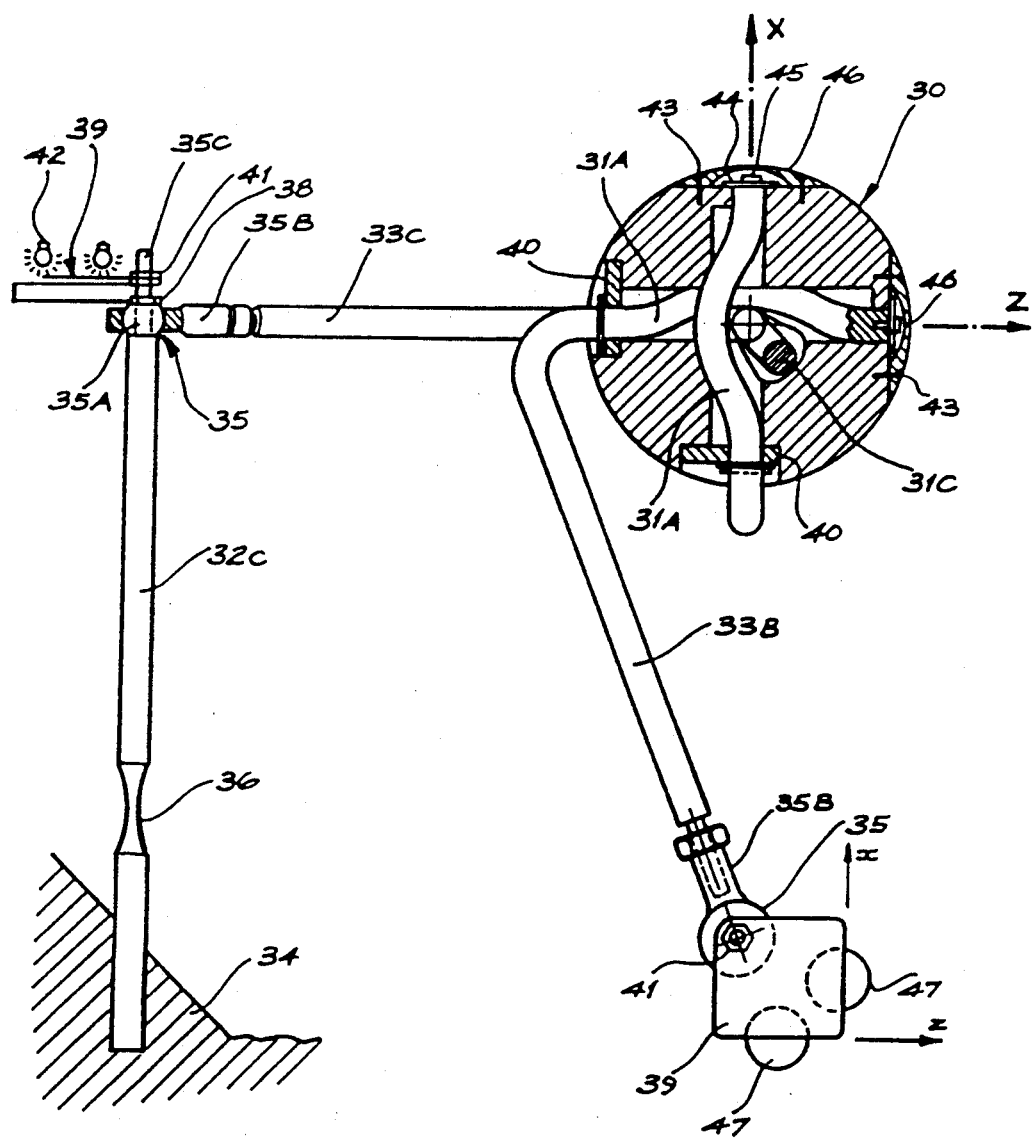
FIG. 5 is a sectional elevational view of a practical embodiment corresponding to FIG. 4 and looking along the Y direction at the device as seen in the X-Z plane.
Figure 6:
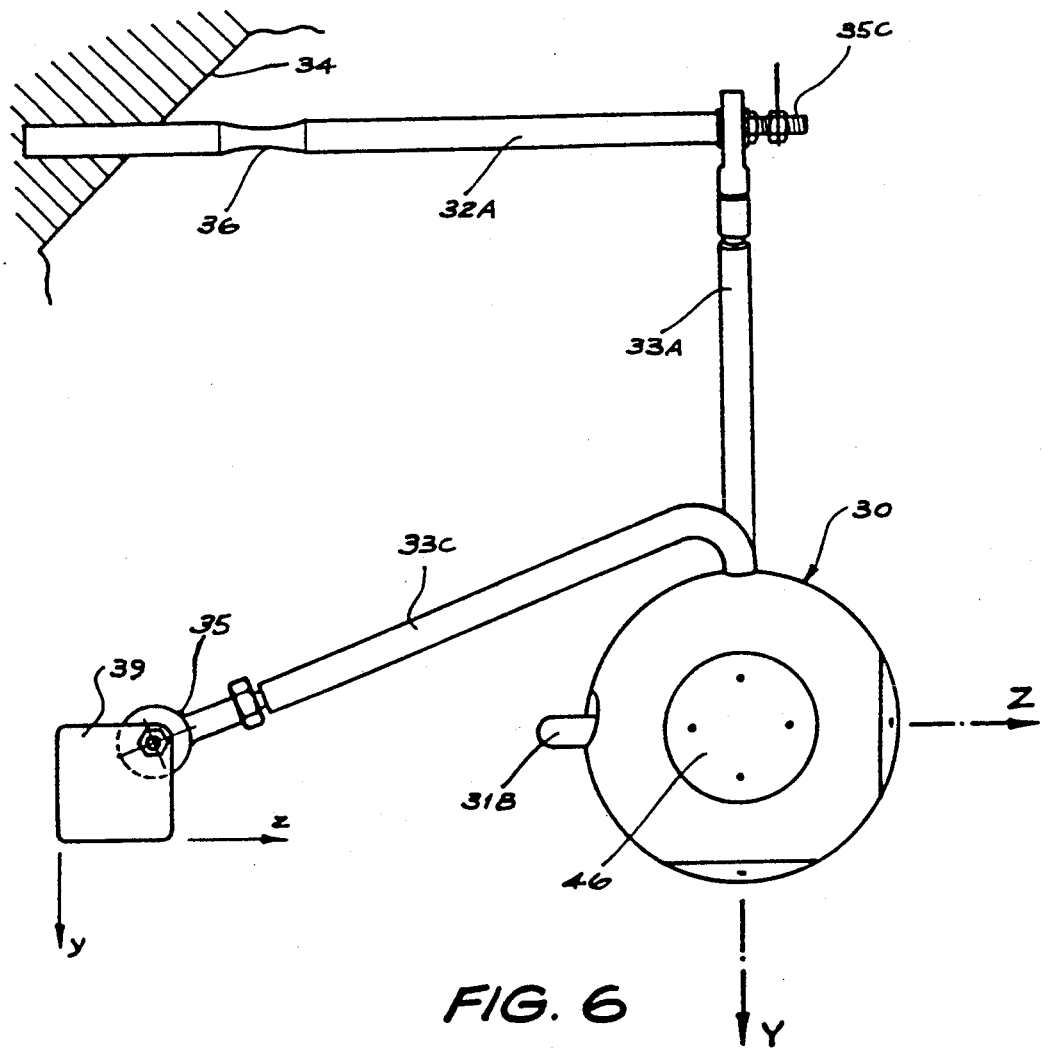
FIG. 6 is a plan view of the embodiment of FIG. 5.

The schematic diagram shown in FIG. 4 is useful for understanding the principles behind the operation of the second embodiment: however, a construction as shown in FIGS. 5 and 6 is a practical embodiment.

The complexities associated with the construction of the second embodiment can be more readily understood by considering one of its mutually perpendicular planes. Thus referring to FIG. 5, an X-Z plane is shown with the Y axis perpendicular to the plane of the paper. The apparatus has corresponding construction and function when considered in either of the other two perpendicular planes. In the embodiment of FIGS. 5 and 6 the same reference numerals have been used for the parts corresponding to the structure shown in FIG. 4.

FIG. 5 is an axial section through the ball-like grip 30 which is adapted to fit comfortably in the operator's hand. The hinges represented by the mounting shafts 31A, 31B, 31C of FIG. 4 are replaced by respective cranked cross-shafts 31A, 31B and 31C which extend from just one side of the ball grip 30 and comprise part of the respective arms 33A, 33B and 33C. The cranked profile of each shaft is to permit the three mutually perpendicular shafts to pass diametrically through the ball and to cross over one another thereby permitting the shafts to be rotatably mounted at each end at bearing points 40 within the ball grip. The free end of each shaft is secured by a screw 45 and washer 44, a part spherical cap 46 being secured over the free end of the shaft by screws 43.

Each ball joint 35 comprises a part-spherical ball member 35A mounted on the leg 32A, 32B and 32C with a corresponding tip element 35B (with a part-spherical cavity) mounted on the end of the respective arms 33A, 33B and 33C. A screw threaded extension 35C extends beyond the ball joint from the leg and the ball joint is assembled by a first securing nut 38. A sensor assembly 39 is then fixed on the screw threaded extension and secured in place by a second nut 41.

The sensor plate assembly 39 mounted on the end of arm 33B extends generally in the X-Z plane. The sensor plate 39 is of opaque material and is adapted to interrupt to a variable and partial extent the passage of light from light sources 42 which are directed towards light dependant resistors 47.

Reference will now be made to FIG. 7 to 9 which show a preferred and alternative mounting arrangement for the respective legs of the embodiment of FIGS. 4 to 6. One mounting unit is shown in each of FIGS. 7 to 9 and has the general feature of providing true displacement in a plane, whereas in the arrangement of FIGS. 4 to 6 the displacement is in a very small arc of a sphere and is thus not true planar motion and very small errors are introduced into the results obtained.

In FIGS. 7 to 9 the parts for mounting the ball grip corresponding to leg-arm combination 32A, 33A are shown; like reference numerals are used for like parts.

A rigid base plate 34 is adapted to be fixed to a rigid mount so as not to move in space. The mounting arm 33A is pivotally connected to the hand grip (not shown) and is connected to the base plate 34 through a resiliently displacable mounting leg arrangement; the arm has a ball joint including a ball 35A extending from the arm 33A and engaged in a seat of the mounting leg arrangement. This leg arrangement comprises a generally pear-shaped rigid plate 32A providing a seat for the ball 35A, a first set of spring legs 36A, a rigid connecting disk 36B and secondary spring legs 36C extending parallel to the first set of legs and connected to the base 34. The respective sets of legs are alternately spaced equally around a circular path and thus form essentially a complex spring structure. Any motion of the mounting arm 33A in a plane parallel to the plate 32A causes the three spring legs 36A to be bent resiliently into a shallow S-shape, reaction occurs through the disk 36B, and the secondary legs 36C bend resiliently into a corresponding S-shape bent in the opposite direction. Thus, an applied force to the hand grip 30 causing displacement of the arm 33A in the relevant plane causes motion of the plate 32A and thus motion of an attached shutter 39 in a parallel plane thereto. Displacement is detected by the degree of interruption of a light source (not shown) impinging on photodiodes 47.

From FIG. 8 it will be seen that the shutter 39 has operating edges 39a and 39b extending at right angles so that displacement in the plane is resolved in two components. The shutter is mounted on a mounting shaft 39c extending from the pear-shaped plate 32A through an aperture in the rigid base 34, the rigid base carrying the photodiodes.

FIG. 7 shows most clearly respective bosses 36D through which the resilient legs 36A extend, these bosses extending into respective apertures in the base 34. Any excessive movement of the arm 33A causes one or more of the bosses to abut the wall of the corresponding aperture thereby providing a limit to movement.

Figure 10:
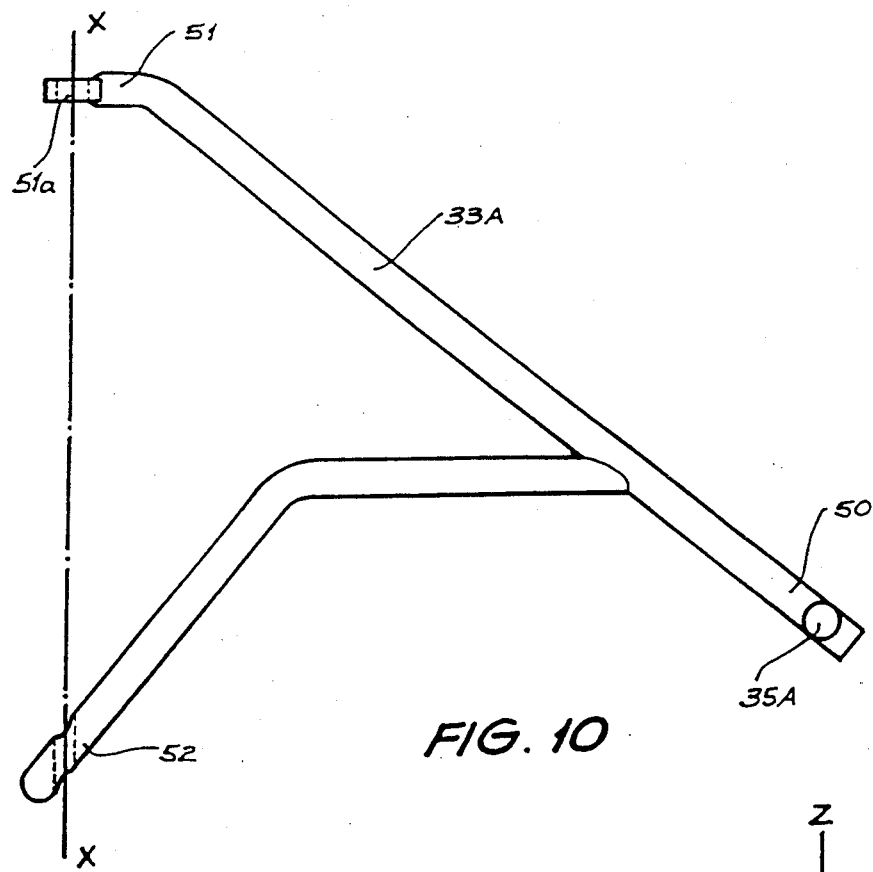
FIG. 10 is a plan view of an alternative embodiment of connecting arm for use with the operator hand grip shown in FIGS. 12 and 13 and corresponding to the arms 33A, 33B and 33C of FIGS. 4 to 6.
Figure 11:
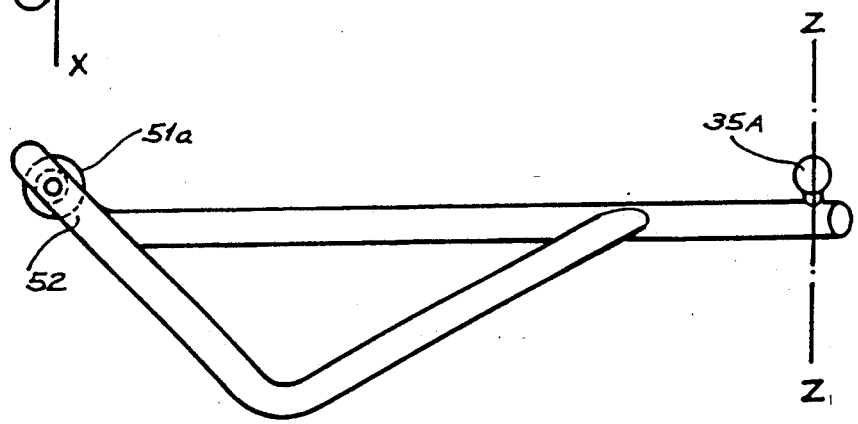
FIG. 11 is an elevation of the mounting arm of FIG. 10.
Figure 12:
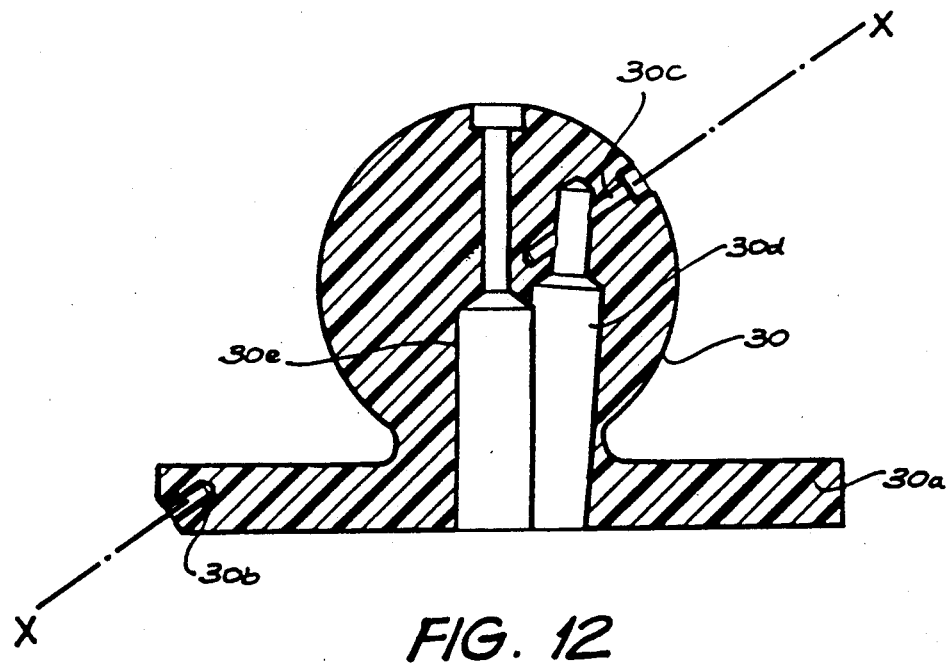
FIG. 12 is an axial cross-sectional elevation of a ball like operators hand grip for use with mounting arms as in FIGS. 10 and 11 in an apparatus functioning in a manner equivalent to FIGS. 4 to 6.
Figure 13:
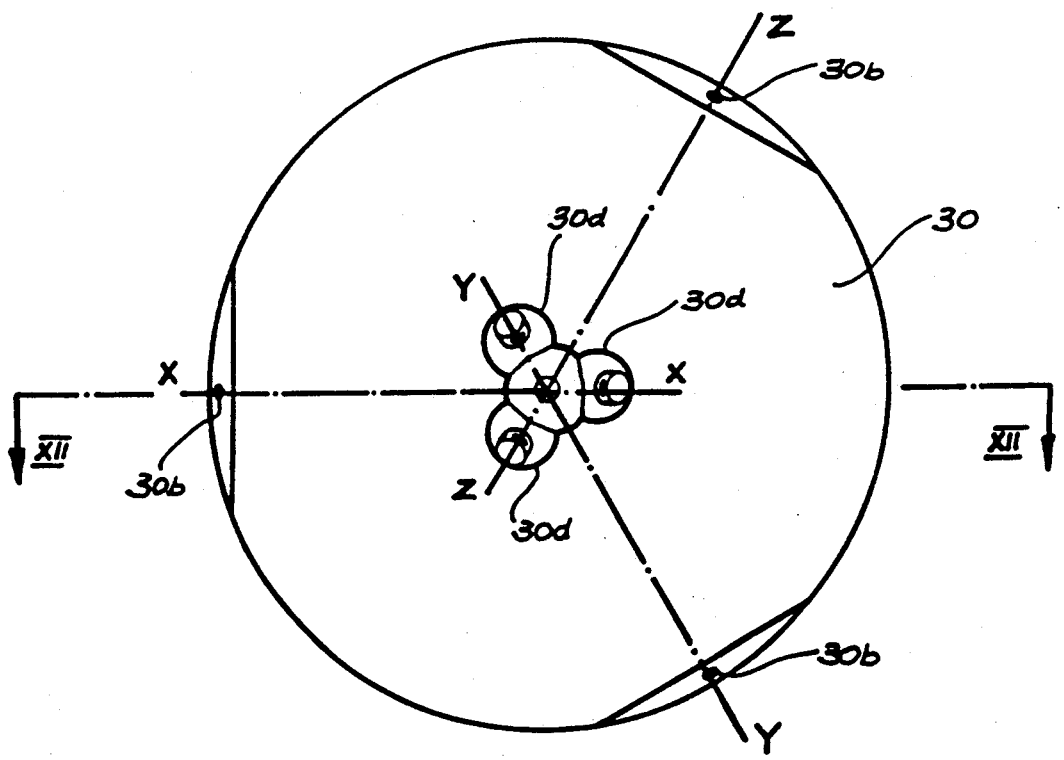
FIG. 13 is an inverted plan view of the operator's grip shown in FIG. 12.

An alternative and advantageous embodiment is a variation on that of FIGS. 4 to 6 and wherein the mounting arm is formed as shown in FIGS. 10 and 11 and the hand grip is as formed in FIGS. 12 and 13. The operating principles are the same, but the construction has advantages.

As shown in FIGS. 10 and 11, the mounting arm referenced 33A has a generally Y-shaped physical form having respective ends 50, 51 and 52. End 50 has, extending laterally therefrom, the ball 35A for connection to the mounting leg (or plate 32A as shown in FIG. 9). End 51 terminates in a sleeve like tip 51a with an aperture extending therethrough (along the X axis) and aligned with a small bore extending obliquely through the tip region of the arm 52.

The hand grip shown in FIGS. 12 and 13 is of plastics material and has a spherical ball-shaped head and a circular base plate 30a, and is adapted to be connected to a set of three arms of the type shown in FIGS. 10 and 11. The base plate 30a has a series of three spaced inclined bores 30b extending from chamfered surfaces and respectively along X, Y and Z axes of the apparatus. A series of three axially aligned corresponding bores 30c are provided in the top portion of the spherical head. FIG. 12 shows a section along the X axis. The arm end 51 of the mounting arm of FIG. 10 and 11 is secured by a bolt to the tapped bore 30b and the end 52 of the arm is inserted through a corresponding interior bore 30d in the spherical head so that the tip of the arm has its oblique bore aligning with the bore 30c for accommodating a securing pin. The pin is threadably engaged in the bore 30c, but is a sliding fit in the oblique bore in the arm end 52.

Thus, the mounting arm has a limited freedom to rotate about the X axis at its connection with the ball-shaped head and freedom about the Z-axis at its connection with the mounting leg arrangement, as conceptually shown in FIG. 4. Therefore, any displacement force on the ball-shaped head and along the X axis or a torque about the X axis results in no displacement of mounting leg 32A associated with arm 33A but in either case the other mounting legs may be displaced and thus the motion detected.

The ball-shaped head includes a central interior bore 30e for clearance purposes for the respective arm ends 52.

The invention can be applied to the control of an industrial robot, whereby pushing and twisting motions of the operator's hand on the grip 30 causes corresponding motions at the respective sensor plate assembly and by computation in accordance with the above equations the applied forces and torques can be determined. This permits corresponding motion to be controlled in the robot.

A further advantageous application of the present invention, in general, exploits the ability of embodiments of the invention to detect and measure force and/or torque applied relative to two parts. An illustrative example is the case of a connection between two aircraft flying in formation and connected by a refueling device. The invention could be incorporated in a coupling whereby the relative applied translational forces and torques between the two aircraft are detected and monitored and indeed in a sophisticated application this might cause the control systems of the aircraft to automatically compensate as may be necessary to keep the applied forces and torques within allowable ranges.

I claim:

1. An apparatus for providing output signals for use as command signals with respect to X, Y, and Z mutually orthogonal axes, the signals being representative of a translational applied force and an applied torque, the apparatus comprising a base, a body to which the forces and torque are applied, resilient connecting means attached to the body and mounting the body for receiving force in any direction and toque about any axis and for urging the body to be displaced relative to the base, a plurality of sensor means capable of providing a set of signals representative of the applied translational force and the applied torque, wherein the base has a stem for mounting the apparatus, and wherein each of the sensor means is mounted and uniformly disposed about an axis of detection, the locus of sensor positions is on a sphere, each sensor means comprising a light emitting means, a light detecting means, and a light interfering means, wherein the light reaching the light detecting means of at least one or more of the sensor means is selectively varied by the light interfering means in response to movement of the body.

2. An apparatus for providing output signals for use as command signals with respect to X, Y and Z mutually orthogonal axes, the signals being representative of a translational applied force and an applied torque, the apparatus comprising a base, a body to which the forces and torques are applied, resilient connecting means attached to the body and mounting the body for receiving force in any direction and torque about an axis and for urging the body to be displaced relative to the base, a plurality of sensor means capable of providing a set of signals representative of the applied translational force and the applied torque, wherein the base has a stem for mounting the apparatus, the body as having generally the shape of a hollow sphere and encompassing both the resilient connecting means and the sensor means, a hole being provided n the hollow sphere for receiving the stem, and wherein each of the sensor means is mounted and uniformly disposed about an axis of detection, each sensor means comprising a light emitting means, a light detecting means and a light interfering means, wherein the light reaching the light detecting means of at least one or more of the sensor means is selectively varied by the light interfering means in response to movement of the body.

3. An apparatus for providing output signals for use as command signals with respect to X, Y and Z mutually orthogonal axes, the signals being representative of a translational applied force and an applied torque, the apparatus comprising of base, a body to which the forces and torques are applied, resilient connecting means attached to the body and mounting the body for receiving force in any direction and torque about an axis and for urging the body to be displaced relative to the base, a plurality of sensor means capable of providing a set of signals representative of the applied translational force and the applied torque, the base having a stem for mounting the apparatus, and wherein each of the sensor means is mounted and uniformly disposed about an axis of detection, the locus of sensor positions being on a sphere, the body having generally the shape of a hollow sphere and encompassing both the resilient connecting means and the sensor means, and wherein a hole is provided in the hollow sphere for receiving the stem, each sensor means comprising a light emitting means, a light detecting means and a light interfering means, wherein the light reaching the light detecting means of at least one or more of the sensor means is selectively varied by the light interfering means in response to movement of the body.

* * * * *